United States Patent [19]
Fukui et al.

[11] Patent Number: 5,182,943
[45] Date of Patent: Feb. 2, 1993

[54] CYLINDER IDENTIFICATION APPARATUS

[75] Inventors: Wataru Fukui; Toshio Iwata; Yutaka Ohashi; Masayuki Ikeuchi, all of Himeji, Japan

[73] Assignee: Mitsubishi Denki K.K., Tokyo, Japan

[21] Appl. No.: 616,493

[22] Filed: Nov. 21, 1990

[30] Foreign Application Priority Data

Nov. 24, 1989 [JP] Japan ................................ 1-305906
Nov. 29, 1989 [JP] Japan ................................ 1-311265
Nov. 29, 1989 [JP] Japan ................................ 1-311266
Nov. 29, 1989 [JP] Japan ................................ 1-311267
Nov. 29, 1989 [JP] Japan ................................ 1-311268

[51] Int. Cl.$^5$ .......................................... G01M 15/00
[52] U.S. Cl. ..................................................... 73/116
[58] Field of Search ................. 73/116; 123/613, 617, 123/414; 307/515

[56] References Cited

U.S. PATENT DOCUMENTS 4,338,813 7/1982 Hunninghaus et al. ............... 73/116
4,365,602 12/1982 Stiller et al. .......................... 123/414
4,615,318 10/1986 Imoto et al. .......................... 123/414
4,766,865 8/1988 Hartel ................................... 123/414
4,827,886 5/1989 Maeda .................................. 123/414

FOREIGN PATENT DOCUMENTS 134069 5/1989 Japan.

Primary Examiner—Jerry W. Myracle
Attorney, Agent, or Firm—Sughrue, Mion, Zinn, Macpeak & Seas

[57] ABSTRACT

A cylinder identification apparatus for a multi-cylinder internal combustion engine. The apparatus includes the following units. A reference signal generator that senses the rotation of an engine crankshaft and generates a reference signal indicating each time the crankshaft is at a prescribed rotational angle. An identification signal generator senses the rotation of the engine camshaft or other member coupled to and rotating at ½ the speed of the crankshaft and generates a cylinder identification signal having a different form for different cylinders of the engine. A control unit identifies each cylinder of the engine based on the form of the cylinder identification signal.

26 Claims, 24 Drawing Sheets

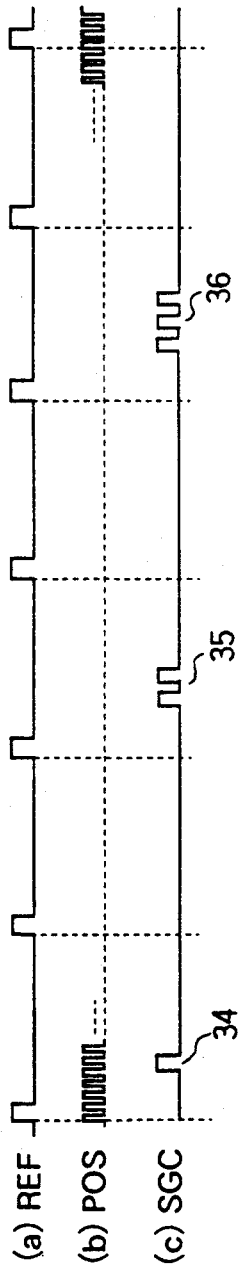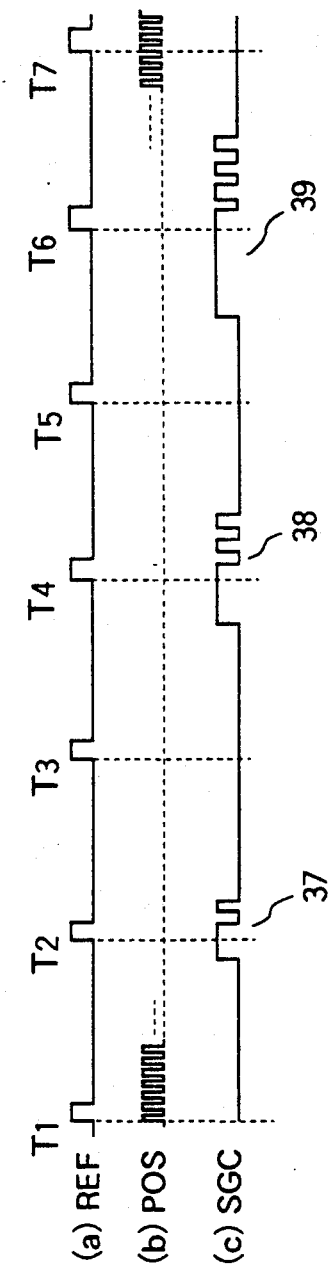

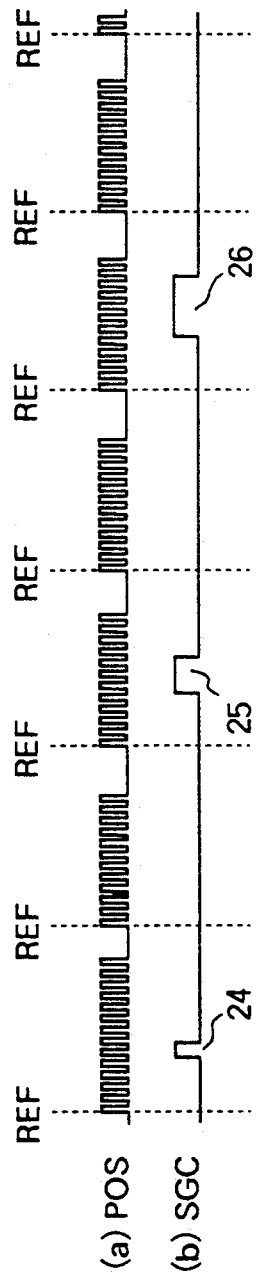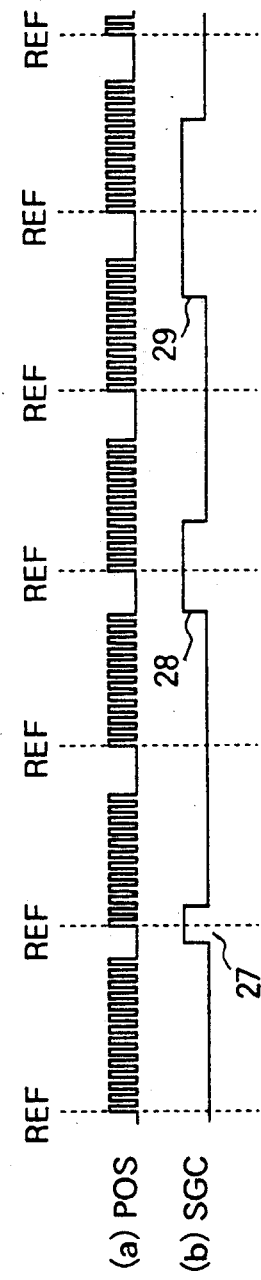

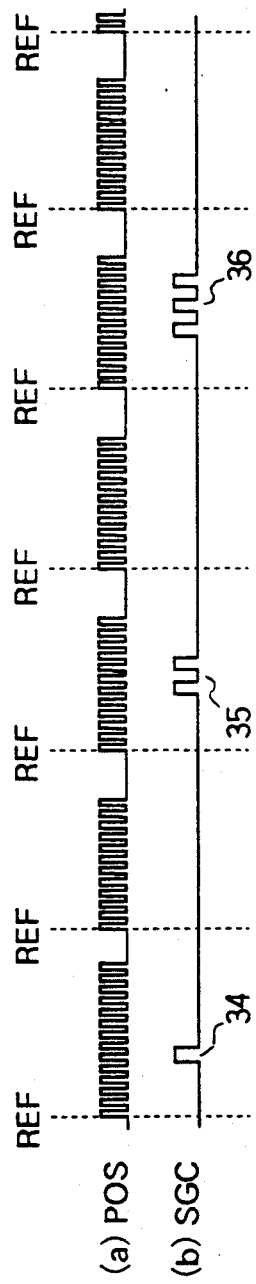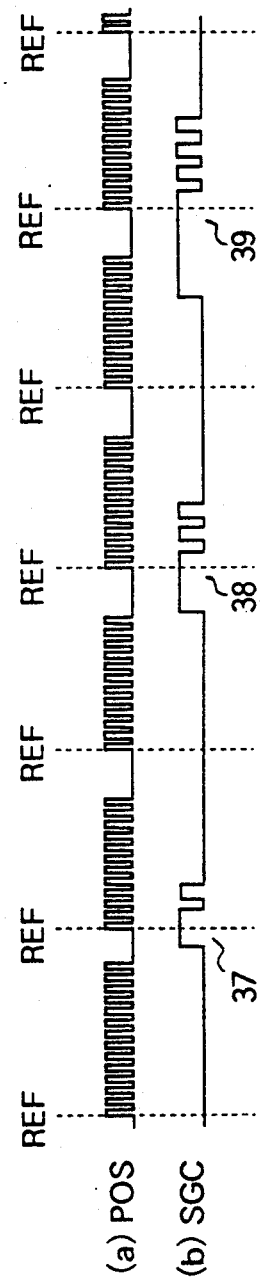

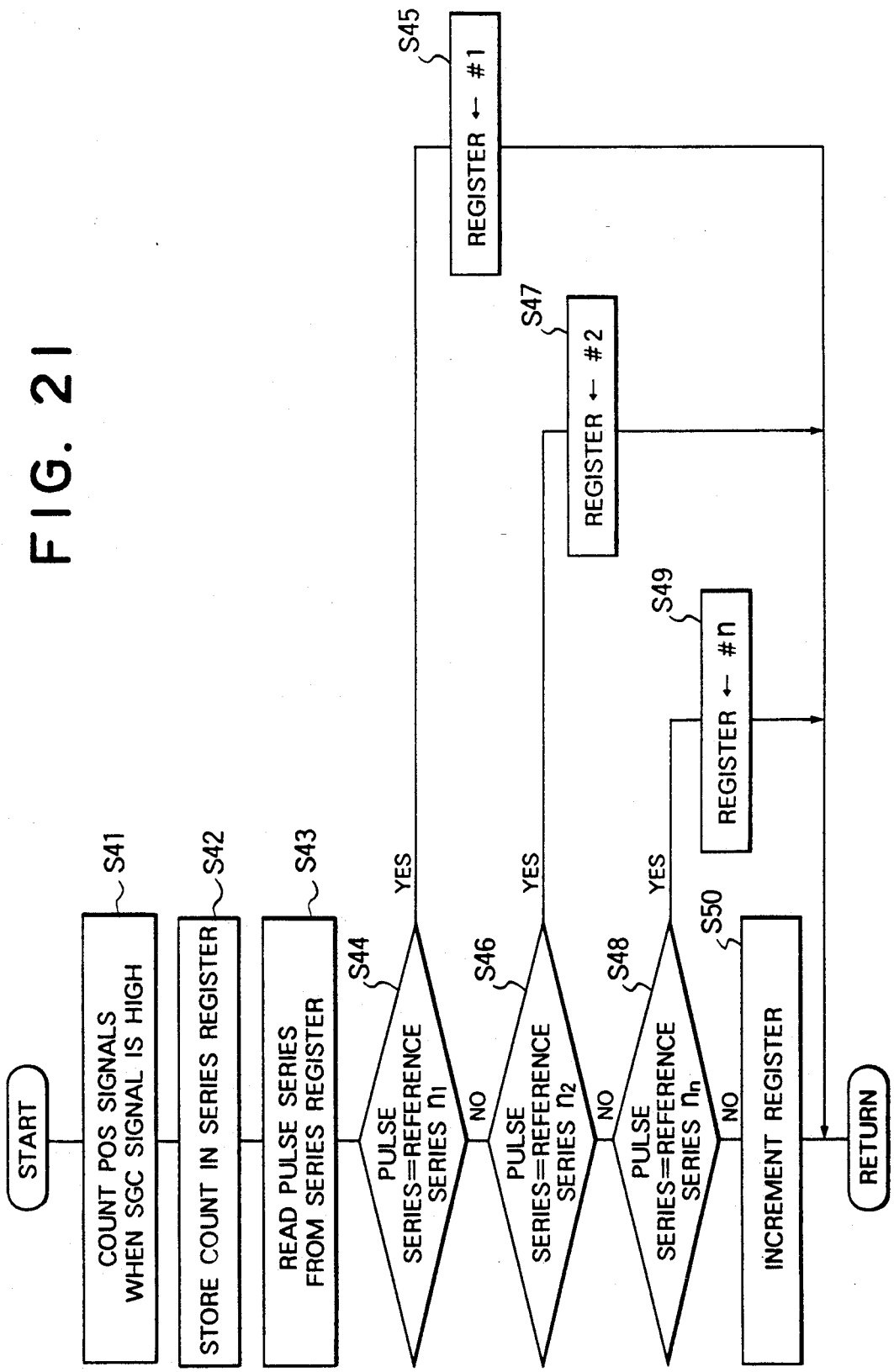

CYLINDER IDENTIFICATION APPARATUS

BACKGROUND OF THE INVENTION

This invention relates to a cylinder identification apparatus for a multi-cylinder internal combustion engine.

As automobile engine make increasing use of electronic control systems, it becomes possible to perform individual control of each cylinder of the engine. In order to carry out individual cylinder control, it is necessary to be able to identify the operating state of each cylinder at any give time. Cylinder identification apparatuses have been developed for carrying out this identification.

A typical cylinder identification apparatus employs sensors for sensing the rotation of some portion of the engine rotating at half the speed of the crankshaft, such as the camshaft or the distributor shaft. One type of conventional cylinder identification apparatus comprises a rotating disk having a plurality of circumferentially-extending slots formed therein, each of the slots corresponding to one of the cylinder of the engine. A light-emitting element and a photoelectric element are disposed on opposite sides of the rotating disk. Each time one of the slots in the disk passes between the light-emitting element and the photoelectric element, the photoelectric element generates an electrical output signal which is used as a cylinder identification signal. Each of the slots has a different circumferential length, so the pulse width of the cylinder identification signal is different for each slot. Therefore, by measuring the pulse width of the cylinder identification signal, it can be determined which cylinder is indicated by a given pulse of the cylinder identification signal. Each of the pulses of the cylinder identification signal occurs at a prescribed crankshaft angle of the engine, so the cylinder identification signal can also be used as a timing signal for controlling the timing of fuel injection and ignition.

While a conventional cylinder identification apparatus is able to perform accurate cylinder identification, it has the problem that the relationship between the timing of the cylinder identification signal and the crankshaft angle of the engine can vary. This is because the rotating shaft on which the rotating disk is mounted is mechanically connected to the crankshaft by belts or gears which can undergo slippage, and therefore a phase difference can develop between the actual crankshaft angle and the crankshaft angle indicated by the cylinder identification signal. When such a phase difference develops, it is impossible to accurately control the timing of ignition and fuel injection on the basis of the cylinder identification signal.

SUMMARY OF THE INVENTION

Accordingly, it is an object of the present invention to provide a cylinder identification apparatus for a multi-cylinder internal combustion engine that can identify the individual cylinders of the engine and at the same time accurately determine the crankshaft angle of the engine.

A cylinder identification apparatus for a multi-cylinder internal combustion engine according to the present invention has a reference signal generator that senses the rotation of an engine crankshaft and generates a reference signal indicating each time the crankshaft is at a prescribed rotational angle. An identification signal generator senses the rotation of the engine camshaft or other member coupled to and rotating at ½ the speed of the crankshaft and generates a cylinder identification signal having a different form for different cylinders of the engine. A cylinder identification means identifies each cylinder of the engine based on the form of the cylinder identification signal.

In preferred embodiments, the cylinder identification signal comprises a series of pulse groups, each of which comprises one or more pulses. Each pulse group corresponds to a cylinder of the engine and has an identifying characteristic. The cylinder identification means identifies the cylinder corresponding to each pulse group based on the identifying characteristic.

In one form of the present invention, each pulse group consists of a single pulse, and the pulse width is different for different pulse groups. The cylinder identification means identifies the cylinder corresponding to each pulse group by measuring the pulse width of each pulse and comparing it with a reference value.

In another form of the present invention, each pulse group comprises one or more pulses, and the number of pulses is different for different pulse groups. The cylinder identification means identifies the cylinder corresponding to each pulse group by counting the number of pulses in the pulse group and comparing it with a reference value.

The reference signal generator is a sensor mounted on the periphery of a flywheel mounted on the crankshaft, so it directly senses the rotation of the crankshaft. As a result, the reference signal accurately indicates the actual crankshaft angle which enables accurate control of the engine timing.

BRIEF DESCRIPTION OF THE DRAWINGS

FIGS. 10 and 11 are waveform diagrams illustrating the output signals of two other embodiments of the present invention.

FIGS. 16 through 20 are waveform diagrams illustrating the output signals of other embodiments of the present invention employing a flywheel like that illustrated in FIG. 14.

FIG. 21 is a flow chart of the operation of another embodiment of the present invention.

DESCRIPTION OF THE PREFERRED EMBODIMENTS

Figure 1:
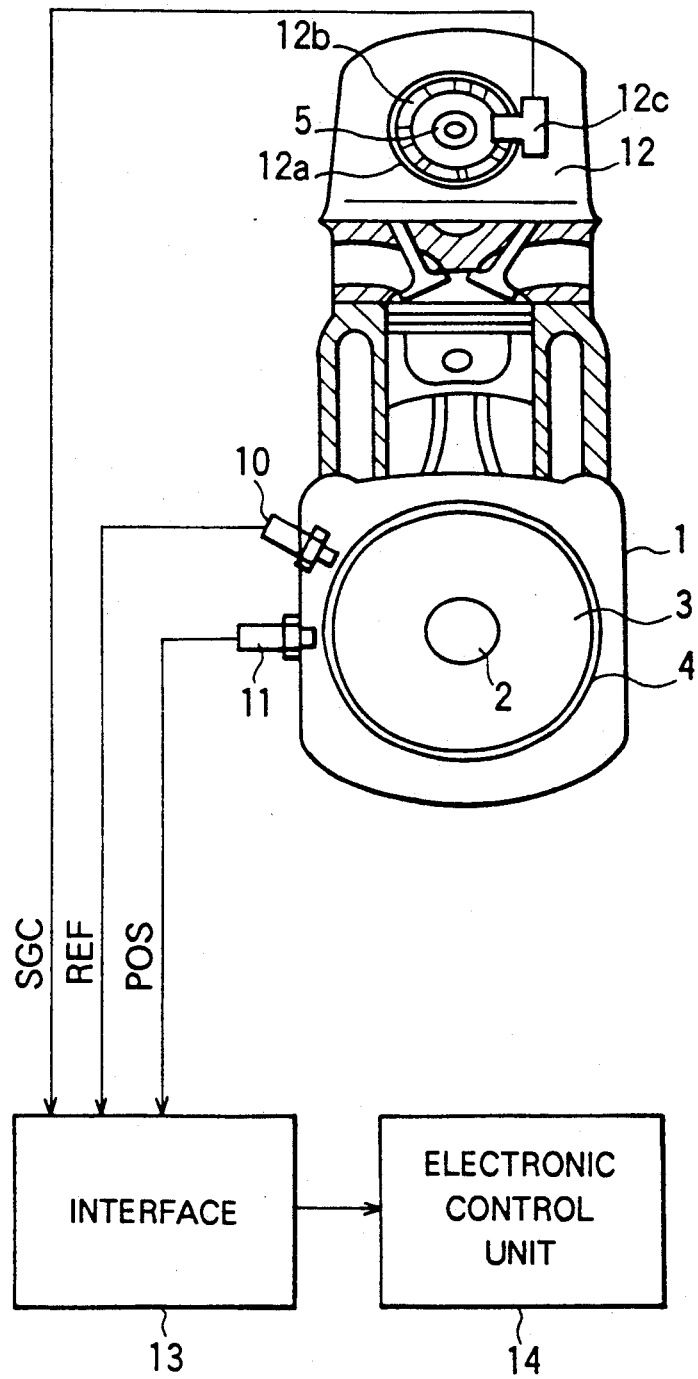
FIG. 1 is a partially cross-sectional elevation of an internal combustion engine equipped with a cylinder identification apparatus according to the present invention.

A number of embodiments of a cylinder identification apparatus according to the present invention will now be described while referring to the accompanying drawings. FIG. 1 is a partially cross-sectional elevation of a four cycle internal combustion engine 1 equipped with an embodiment of the present invention. The present invention can be applied to an engine having any number of cylinders, but in the following description, the case is described in which the engine is equipped with 6 cylinders.

Figure 2:
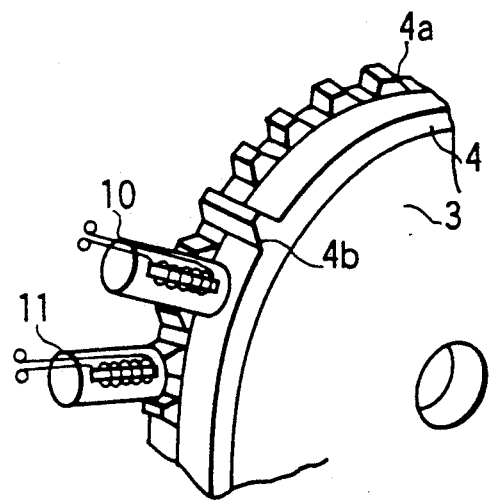
FIG. 2 is a perspective view of a portion of the flywheel of the engine illustrated in FIG. 1.

As shown in FIG. 1, the engine 1 has a crankshaft 2 on which a flywheel 3 is mounted. A ring gear 4 is formed on the outer periphery of the flywheel 3. A reference signal generator 10 and a rotational signal generator 11 are mounted on the engine in the vicinity of the ring gear 4 of the flywheel 3. These signal generators 10 and 11 sense the movement of the teeth of the ring gear 4 as the flywheel 3 rotates and respectively generate a reference angle signal (referred to as a REF signal) and a rotational position signal (referred to as a POS signal). FIG. 2 is a perspective view of the signal generators 10 and 11 and a portion of the flywheel 3. The ring gear 4 of the flywheel 3 has a plurality of regular teeth 4a and a smaller number of reference teeth 4b uniformly spaced around its periphery. The regular teeth 4a extend partially across the width of the ring gear 4, and the reference teeth 4b extend across the width of the ring gear 4. The reference signal generator 10 and the rotational signal generator 11 are electromagnetic sensors disposed near the teeth so that each time one of the teeth passes beneath the corresponding sensor, the sensor generates an electrical pulse. In the present embodiment, the regular teeth 4a are spaced at intervals of 2 degrees in the circumferential direction of the ring gear 4, although the exact spacing is not critical. The reference teeth 4b are spaced at intervals of 120 degrees in the circumferential direction of the ring gear 4. The reference teeth 4b can be separate from the regular teeth 4a, but in the illustrated embodiment, each of the reference teeth 4b is integral with one of the regular teeth 4a so as to form a single tooth extending across the entire width of the ring gear 4. Electromagnetic sensors for sensing the movement of the teeth of a ring gear of a flywheel are well known in the art, and any suitable type can be employed as signal generators 10 and 11.

The engine 1 is also equipped with a camshaft 5 that rotates at half the speed of the crankshaft 2. The rotation of the camshaft 12 is sensed by an identification signal generator 12 that generates a cylinder identification signal that identifies the individual cylinders of the engine 1. The indentification signal generator 12 is not restricted to any specific type, but in the illustrated embodiment, it employs an optical sensor. It includes a rotating disk 12a mounted on the camshaft 5 so as to rotate therewith and an optical unit 12c for sensing the rotation of the disk 12a. The disk 12a has six circumferentially-extending slits 12b formed therein, each of which corresponds to one of the cylinders of the engine. The optical unit 12c includes a light-emitting element and a photosensor disposed on opposite sides of the disk 12a. Each time one of the slits 12b of the disk 12a passes between the light-emitting element and the photosensor, the photosensor generates an electrical pulse. The output signal of the identification signal generator 12 will be referred to as the SGC signal. The slits 12b in the disk 12a have various lengths, so the pulse width of the pulses in the SGC signal varies as the disk 12a rotates.

The REF signal, the POS signal, and the SGC signal are input to an electronic control unit (ECU) 14 via an interface 13. The ECU 14 identifies the individual cylinders of the engine 1 based on the input signals. The ECU 14 preferably comprises a microcomputer including a CPU and a memory for storing a program to be executed by the CPU.

Figure 3:
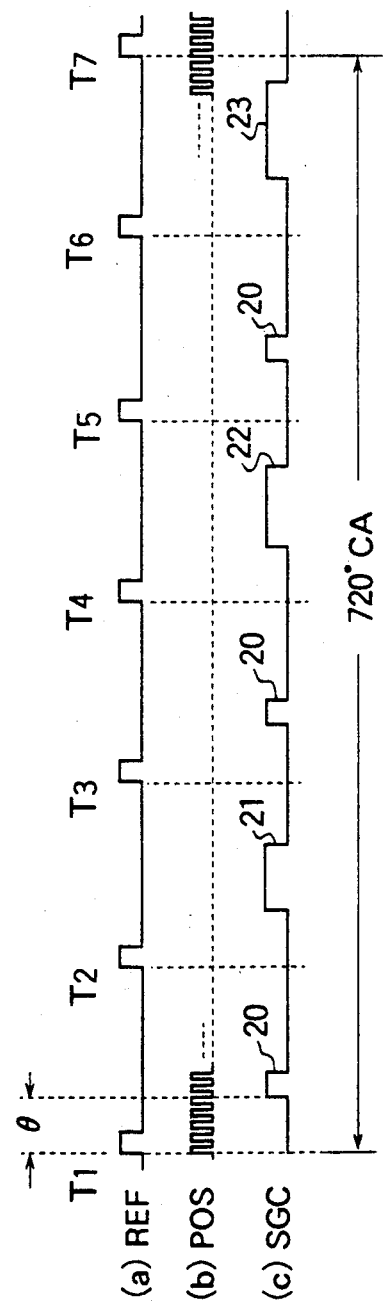
FIG. 3 is a waveform diagram illustrating the output signals of an embodiment of a cylinder identification apparatus according to the present invention.

FIG. 3 is a waveform diagram illustrating the REF signal, the POS signal, and the SGC signal of an embodiment of the present invention having the structure illustrated in FIG. 1 after the signals have undergone waveform shaping. The REF signal comprises pulses of a prescribed width generated every 120 degrees of crankshaft rotation. The POS signal comprises pulses of a prescribed width generated every two degrees of crankshaft rotation, for example. The SGC signal comprises a series of pulses having four different pulse widths. The disk 12a of the identification signal generator 12 is mounted on the camshaft 5 so that each pulse of the SGC signal is generated between the rising edges of two successive pulses of the REF signals. Furthermore, the SGC signal has a high level only when the REF signal has a low level. Every other pulse of the SGC signal is a first pulse 20 having a first pulse width. The first pulses 20 alternate with a second pulse 21, a third pulse 22, and a fourth pulse 23 having different pulse widths from each other and from the first pulses 20. In the example of FIG. 3, the second pulse 21 has a greater pulse width than the first pulses 20, the third pulse 22 has a greater pulse width than the second pulse 21, and the fourth pulse 23 has a greater pulse width than the third pulse 22, but the relative sizes of the pulse widths can be varied as long as the first pulses 20 all have the same pulse widths and the other pulses have different pulse widths. The SGC signal of FIG. 3 can be obtained by forming the disk 12a of the identification signal generator 12 with three slits 12b of the same length and three more slits 12b of different lengths.

The leading edge of each pulse of the SGC signal is delayed by a prescribed offset $\theta$ from the leading edge of the immediately preceding REF signal pulse. In the present embodiment, $\theta$ has the same magnitude for each pulse of the SGC signal, but a uniform value is not necessary. The offset $\theta$ guarantees that even if mechanical slippage occurs between the crankshaft 2 and the camshaft 5, the SGC signal pulses will not overlap the REF signal pulses.

The series of pulses illustrated in FIG. 3 repeats itself every 720 degrees of crankshaft rotation.

Cylinder identification by the ECU 14 of FIG. 1 will be described using the flow chart of FIG. 4, which illustrates an example of a program which can be performed by the microcomputer of the ECU 14. The microcomputer receives the REF signal, the POS signal, and the SGC signal via the interface 13. In step S1, when the microcomputer receives a pulse of the SGC signal, it determines the pulse width of the pulse by counting the number of pulses of the POS signal occurring when the SGC signal has a high level. In Step S2, the pulse count determined in Step S1 is compared with a plurality of reference values stored in the mircocomputer. Each of the reference values corresponds to one of the second through fourth pulses 21–23 of the SGC signal (and therefore corresponds to one of the cylinders of the engine) and indicates the number of POS signal pulses that occur during the corresponding pulse. Since the number of POS signal pulses occuring during a given one of the SGC signal pulses is a constant value independent of the engine rotational speed, the reference values can be stored in the microcomputer in advance at the time of manufacture. When the pulse count matches one of the reference values, in Step S3, the number of the cylinder that corresponds to the matching reference value is set in a cylinder identification register of the microcomputer. The cylinder number in the cylinder identification register indicates which cylinder of the engine is in a specific state at that time. Since the firing order of the engine is a fixed parameter, the state of each cylinder of the engine at any given time can be determined from the value presently stored in the cylinder identification register.

If the pulse count determined in Step S1 does not match any of the reference values, it means that the pulse of which the pulse width was measured in Step S1 is one of the first pulses 20. In this case, the cylinder corresponding to this pulse is identified based on the previously identified cylinder, and the number of the identified cylinder is set in the cylinder identification register. For example, if the previously identified cylinder is the cylinder corresponding to the second pulse 21 (cylinder #2, for example), when the next pulse of the SGC signal (which is one of the first pulses 20) occurs, the cylinder number set in the cylinder identification register will be that of the cylinder that follows cylinder #2 in the firing order.

The rotational signal generator 10, which generates the REF signal, directly senses the rotation of the crankshaft 2, so there is never any phase deviation between the crankshaft angle indicated by the REF signal and the actual crankshaft angle. Therefore, if the REF signal is used as a reference, the ignition timing can be controlled very precisely.

Since the SGC signal uses only four different types of pulses (pulses 20–23) for identifying the six cylinders of the engine, the differences among the pulse widths can be greater than if six different types of pulses were employed as in a conventional cylinder identification apparatus. Therefore, the precision of the pulse widths, and therefore the precision of the lengths of the slits 12b in the rotating disk 12a are not critical, so the disk 12a can be inexpensively manufactured. Furthermore, the precision required of the optical unit 12c is decreased, so the cost of the optical unit 12c can be reduced.

The embodiment of FIG. 3 can be adapted to an engine having other than 6 cylinders, in which case the number of different types of pulses in the SGC signal will vary. In a four-cylinder engine, three different types of pulses (pulses corresponding to the first, second, and third pulses 20–22, for example) are sufficient to identify all four cylinders. On the other hand, in an eight-cylinder engine, five different types of pulses (pulses corresponding to the first through fourth pulses 20–23 plus a fifth pulse having still a different pulse width, for example) are necessary to identify all eight cylinders. Thus, in general, $(n/2+1)$ different pulses are necessary to identify all the cylinders of the engine, wherein n is the number of cylinders.

Figure 5:
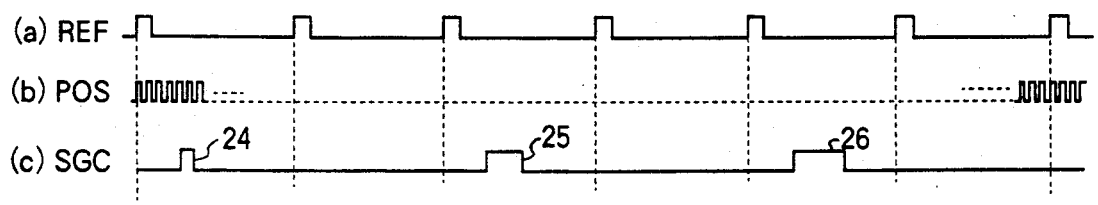
FIGS. 5 and 6 are waveform diagrams illustrating the output signals of two other embodiments of the present invention.

FIG. 5 is a waveform diagram illustrating the REF signal, the POS, and the SGC signal of another embodiment of the present invention subsequent to waveform shaping. The structure of this embodiment is similar to that of the present invention except that the identification signal generator 12 employs a Hall-effect sensor instead of an optical unit. The SGC signal which is output by the identification signal generator 12 comprises three pulses 24–26, each of which corresponds to one of the cylinders of the engine and has a different pulse width. Each pulse of the SGC signal is generated between consecutive pulses of the REF signal, i.e., when the REF signal has a low level. However, the pulses of the SGC signal occur only between every other pair of pulses of the REF signal, and between the other pairs of pulses of the REF signal, the SGC signal has a low level. The rising and falling edges of the SGC signal are offset from the edges of the pulses of the REF signal by a prescribed margin so that even when there is slippage between the crankshaft 2 and the camshaft 5, the REF signal pulses and the SGC signal pulses will not overlap.

Figure 4:
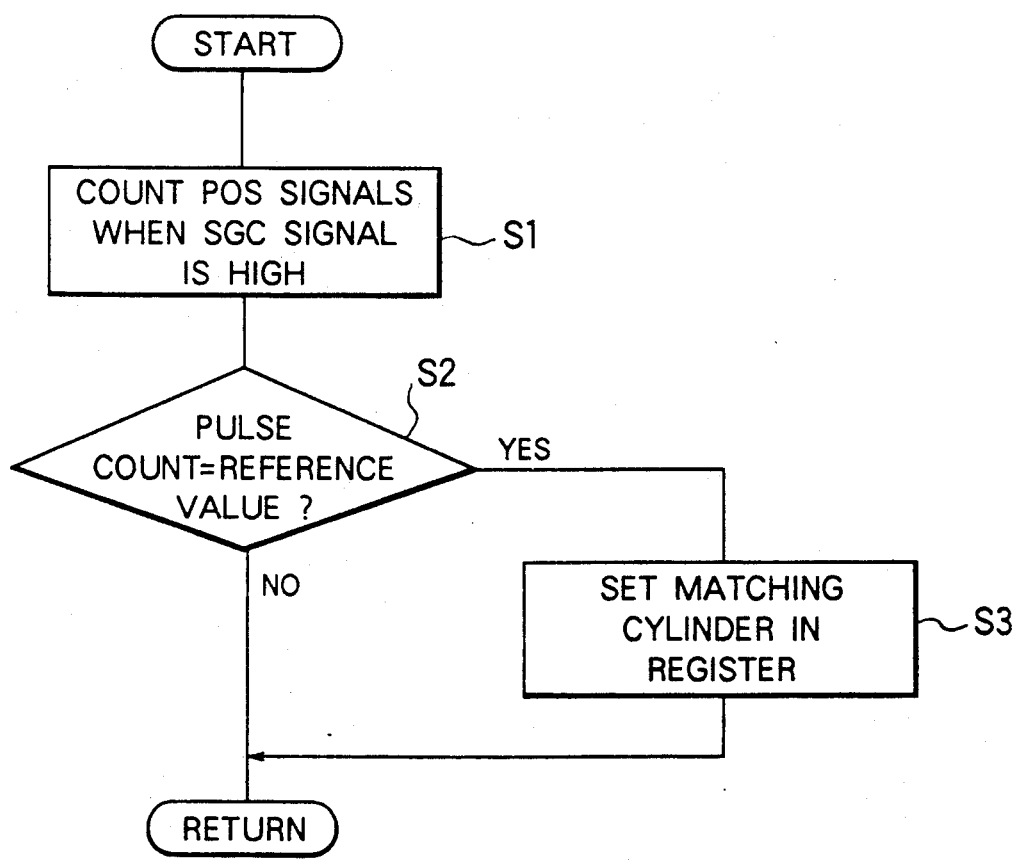
FIG. 4 is a flow chart illustrating the operation of the embodiment having the output signals illustrated in FIG. 3.

Cylinder identification is carried out by this embodiment in a manner similar to that described with respect to FIG. 4. Each time a pulse of the SGC signal is generated, the microcomputer of the ECU 14 determines the pulse width by counting the number of pulses of the POS signal occurring when the pulse of the SGC signal has a high level. The pulse count is then compared with reference values corresponding to different cylinders of the engine, and the number of the cylinder corresponding to the reference value that matches the measured pulse count is set in a cylinder identification register of the microcomputer. If there is no pulse of the SGC signal between consecutive pulses of the REF signal, then the measured pulse count is zero, so cylinder identification is performed based on the previously identified cylinder.

For example, if the most recently identified cylinder is the cylinder corresponding to pulse 24 (cylinder #1, for example), during the period between the next pair of pulses of the REF signal, the pulse width of the SGC signal will be zero, so the cylinder number set in the cylinder identification register will be the cylinder following cylinder #1 in the firing order.

In this embodiment, since the SGC signal has only three different types of pulses, the difference among the pulse widths can be made larger than in the embodiment of FIG. 3 having four different types of pulses. Due to the large difference in pulse widths, the three pulses can be easily distinguished from one another, so the accuracy of the pulse widths is less critical than in the embodiment of FIG. 3. Accordingly, the identification signal generator 12 can employ a Hall-effect sensor or the like, which has a lower precision but is less expensive than an optical sensor.

Figure 6:
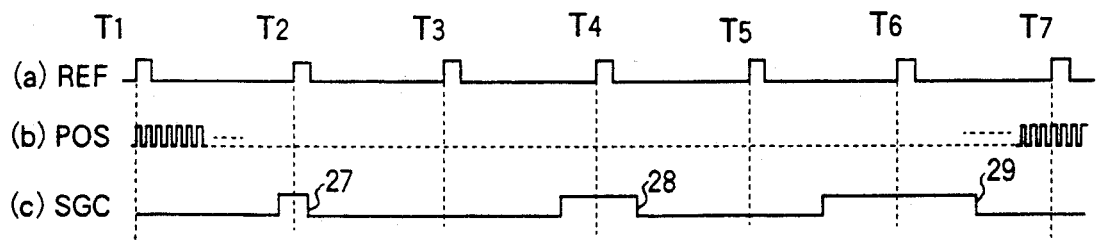

FIG. 6 is a wave form diagram illustrating the REF signal, the POS, and the SGC signal of another embodiment of the present invention subsequent to wave form shaping. Like the previous embodiment, this embodiment employs a Hall-effect sensor as the identification signal generator 12 but is otherwise similar to the embodiment of FIG. 1. The SGC signal output by the identification signal generator 12 comprises three pulses 27-29, each of which corresponds to one of the cylinders of the engine and has a different pulse width. Each of the pulses of the SGC signal overlaps one of the pulses of the REF signal, with its rising and falling edges offset from the rising and falling edges of the pulse of the REF signal. However, the SGC signal pulses are generated only during alternate REF signal pulses, the SGC signal having a low level during the other REF signal pulses.

Figure 7:
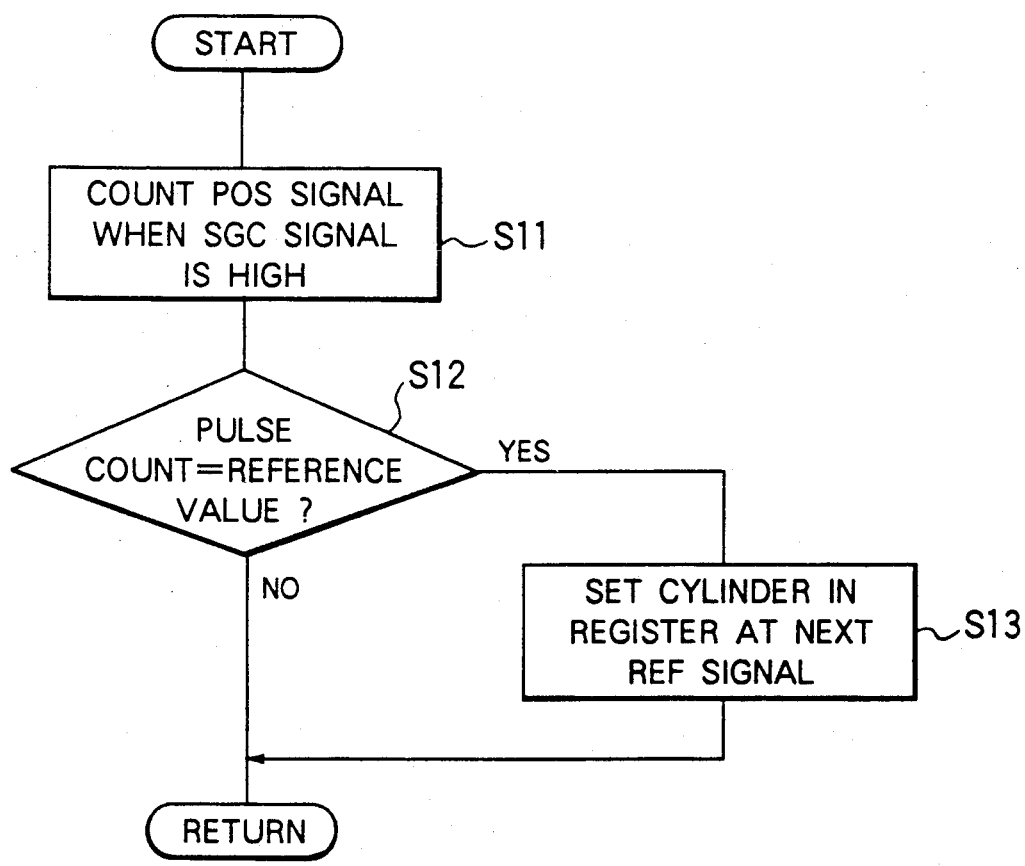
FIG. 7 is a flow chart illustrating the operation of the embodiment having the output signals illustrated in FIG. 6.

Cylinder identification using this embodiment will be described with reference to the flow chart of FIG. 7, which shows an example of a program that can be performed by the microcomputer of the ECU 14. In Step S11, the microcomputer determines the pulse width of the SGC signal occurring between every other pulse of the REF signal by counting the number of pulses of the POS signal occurring when the SGC signal has a high level. Namely, it counts the number of POS signal pulses occurring while the SGC signal is high between times T1 and T3, between times T3 and T5, between times T5 and T7, etc. In Step S12, the pulse count determined in Step S11 is compared with a plurality of reference values corresponding to different cylinders of the engine. When the microcomputer senses the rising edge of the REF signal occurring when the SGC has a low level, in Step S13, it sets the number of the cylinder corresponding to the reference value that matches the pulse count in a cylinder identification register as the most recently identified cylinder. When the next rising edge of the REF signal is generated (the one occurring when the SGC signal has a high level), the value in the cylinder identification register is changed by a prescribed amount so as to equal the cylinder number of the next cylinder in the firing order. At the same time, the pulse width of the SGC signal is measured and Step S11 is returned to. This process is continually repeated to identify each cylinder of the engine.

In the embodiment of FIG. 6, the pulse width of the SGC signal, i.e., the length of time that the SGC signal has a high level is used to identify the cylinders. However, it is instead possible to measure the length of time between consecutive pulses of the SGC signal (the length of time for which the SGC signal has a low level between pulses) and obtain the same results. Alternatively, it is possible to measure both the length of the high level periods and the low level periods.

In the above-described embodiments, the pulse width of the SGC signal is detected by counting the number of pulses of the POS signal occurring when the SGC signal has a high level. However, it is instead possible to identify the cylinders by measuring the ratio of the pulse width of the SGC signal to the period between REF signal pulses without using the POS signal, and the same effects can be obtained.

Figure 8:
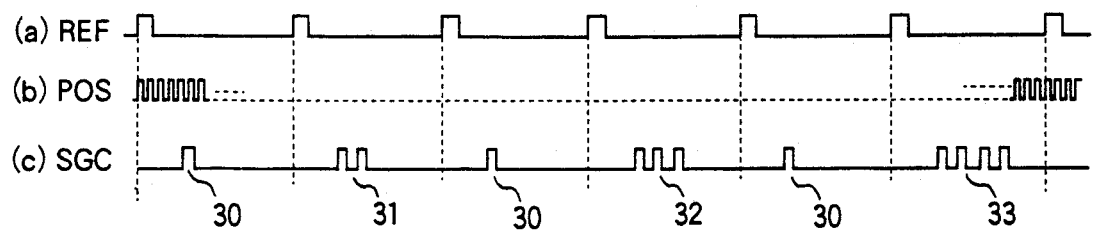
FIG. 8 is a waveform diagram illustrating the output signals of another embodiment of the present invention.

FIG. 8 is a waveform diagram illustrating the REF signal, the POS, and the SGC signal of another embodiment of the present invention subsequent to waveform shaping. This embodiment differs from the embodiment of FIG. 3 in that the SGC signal comprises four different groups of pulses having a different number of pulses. Each pulse group of the SGC signal is generated between consecutive REF signal pulses (when the REF signal has a low level). Every other pulse group is a first pulse group 30 containing 1 pulse. The first pulse groups alternate with a second pulse group 31 containing 2 pulses, a third pulse group 32 containing three pulses, and a fourth pulse group 33 containing four pulses. The number of pulses in the groups can be different from that shown, as long as the first pulse groups all contain the same number of pulses and the other groups 31-33 contain different numbers of pulses from each other and from the first pulse group 30. In this embodiment, the identification signal generator 12 is an electromagnetic pickup.

Figure 9:
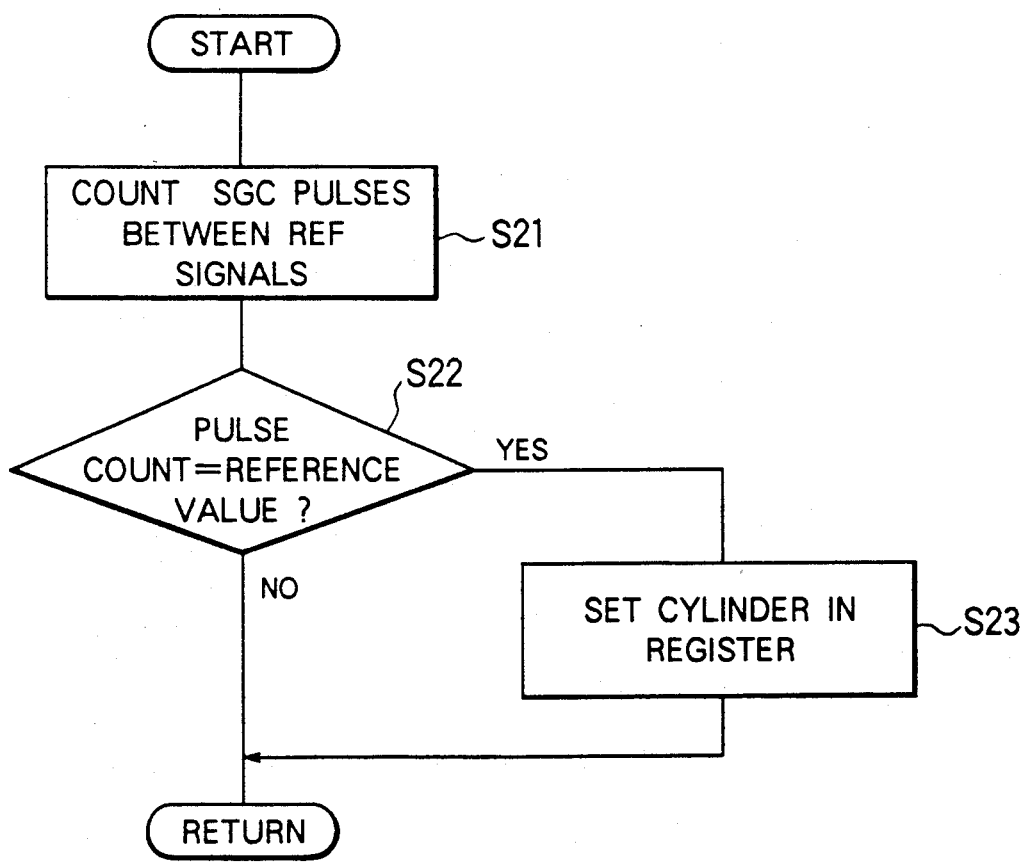
FIG. 9 is a flow chart illustrating the operation of the embodiment having the output signals illustrated in FIG. 8.
Figure 12:
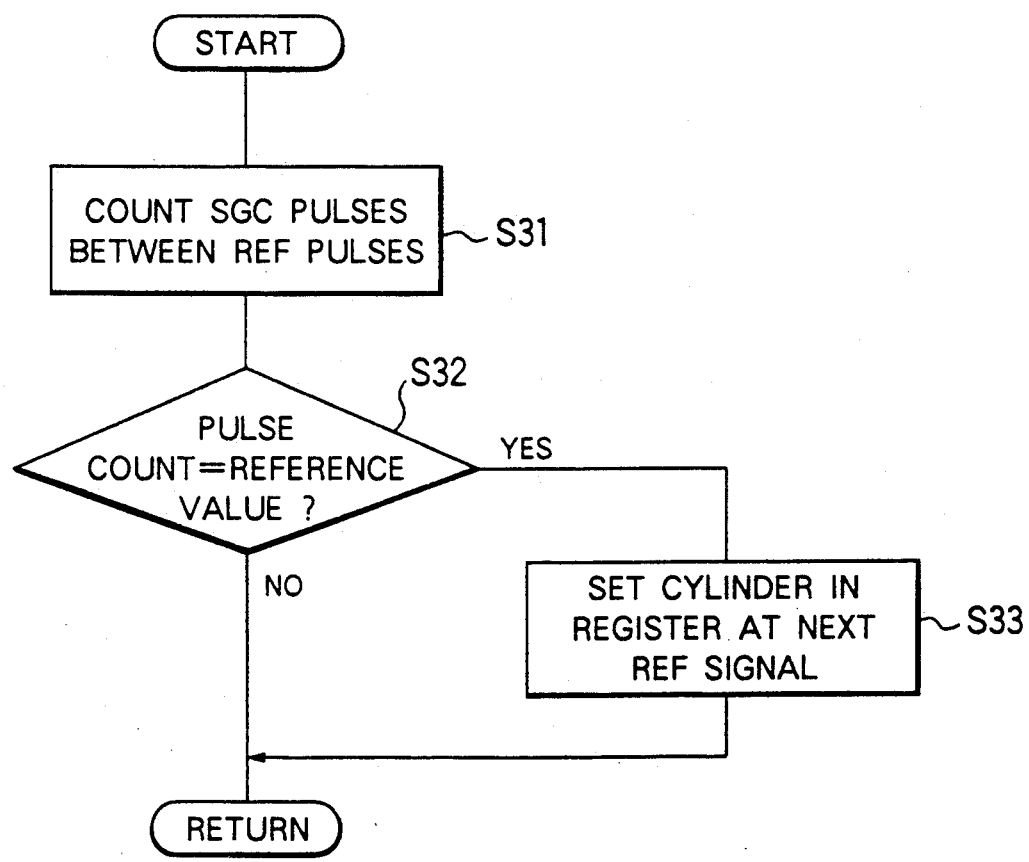
FIG. 12 is a flow chart illustrating the operation of the embodiment having the output signals illustrated in FIG. 11.

Cylinder identification using this embodiment will be described with reference to the flow chart of FIG. 9, which shows an example of a program that can be performed by the microcomputer of the ECU 14. In Step S21, the microcomputer counts the number of pulses in a pulse group of the SGC signal occuring between successive pulses of the REF signal. In Step S22, the number of pulses counted in Step S21 is compared with a plurality of reference values (in this case 2, 2, or 4), each of which corresponds to one of the cylnders of the engine and indicates the number of pulses in the second through fourth pulse groups 31-33. If the pulse count measured in Step S21 matches one of the reference values, then in Step S23, the number of the cylinder corresponding to the reference value is set in the cylinder identification register. If the pulse count does not match any of the reference vvales, i.e., if the pulse count equals 1, then the value in the cylinder identification register is changed by a prescribed value so as to equal the number of the cylinder next in the firing order. Thus, whenever the number of pulses counted in Step S21 equal 1, cylinder identification is carried out based on the previous result of cylinder identification.

In this embodiment, different cylinders are identified by counting the number of pulses in pulse groups of the SGC signal instead of by measuring the pulse width of the SGC signal pulses. It is easier to count pulses than to measure pulse width, and it is not necessary for each of the pulses in the SGC signal to have a precises pulse width or spacing. Therefore, a low cost electromagnetic sensor can be used as the identification signal generator 12 instead of a more expensive optical sensor.

The embodiment of FIG. 8 is for a six-cylinder engine. However, this embodiment can be applied to an engine with a different number of cylinders, in which case the number of different pulse groups will vary. It can be seen that in an engine having n cylinders (wherein n is an even number), a total of (n/2+1) different pulse groups are necessary to identify all the cylinders of the engine. For example, three different pulse groups are necessary for a four-cylinder engine, while five different pulse groups are necessary for an eight-cylinder engine.

FIG. 10 is a waveform diagram illustrating the REF signal, the POS, and the SGC signal of another embodiment of the present invention subsequent to waveform shaping. This embodiment is similar to the embodiment of FIG. 8 in that the SGC signal comprises a plurality of pulse groups generated between successive pairs of REF signal pulses, each pulse group comprising one or more pulses. However, the SGC signal pulses are generated only during the periods between every other pair of REF signal pulses, and during the periods between the other pairs of REF signals pulses, the SGC signal has a low level. The SGC signal comprises three pulse groups containing different numbers of pulses. A first pulse group 34 contains 1 pulse, a second pulse group 35 contains two pulses, and a third pulse group 36 contains three pulses, although the number of pulses in the different groups is not limited to these values. The identification signal generator 12 for generating the SCG signal can be an electromagnetic pickup. The structure of this embodiment is otherwise the same as that of the previous embodiment.

During the periods between successive pairs of REF signal pulses, the microcomputer of the ECU 14 counts the number of pulses of the SGC signal and compares the pulse count with reference values (in this case 1, 2, or 3), each of which corresponds to one of the cylinders of the engine. If the pulse count matches one of the reference values, then the corresponding cylinder number is set in a cylinder identification register of to microcomputer. If the pulse count equals zero, then cylinder identification is carried out based on the previous result of cylinder identification, i.e., the number of the cylinder next in the firing order after the previously identified cylinder is set in the cylinder identification register.

In the embodiment of FIG. 10, there are only half as many groups of pulses as there are cylinders, so recognizing the number of pulses is easy, and the precision of the signals can be reduced. This embodiment can be adapted to a cylinder having other than six cylinders, but the number of different pulses will still be half the number of cylinders.

FIG. 11 is a waveform diagram of the REF signal, the POS signal, and the SGC signal of another embodiment of the present invention subsequent to waveform shaping. In this embodiment, the SGC signal comprises three different pulse groups 37, 38, and 39. Each group corresponds to one of the cylinders of the engine and has a different number of pulses. For example, group 37 has two pulses, group 38 has three pulses, and group 39 has four pulses. The first pulse in each group is longer than the other pulses in the same group and is different is length from the first pulse in the other groups. The rising edge of every other REF signal pulse (those occurring at times T2, T4, T6, etc.) falls between the rising and falling edges of the first pulse in one of the groups. The rising edges of the first pulses in groups 37, 38, and 39 are each offset by a different amount with respect to the rising edge of one of the REF signal pulses, although they can instead be offset by the same amount. At the time of the remaining REF signal pulses (at times T1, T3, T5, T7, etc.) the SGC signal has a low level. As in the preceding embodiment, the identification signal generator 12 is an electromagnetic sensor. The structure of this embodiment is otherwise the same as that shown in FIG. 1.

Cylinder identification using this embodiment will be described with reference to the flow chart of FIG. 22, which shows an example of a program that can be performed by the microcomputer of the ECU 14. In Step S31, the microcomputer counts the number of pulses in a pulse group of the SGC signal during the periods between REF signal pulses when the SGC signal has a low level. Namely, it counts the number of SGC signal pulses in the periods T1 to T3, the period T3 to T5, the period T5 to T7, etc. In Step S32, the pulse count determined in Step S31 is compared with a plurality of reference values (in this case 2, 3, or 4), each of which corresponds to one of the cylinders and indicates the number of pulses in pulse groups 37–39, respectively. The cylinder corresponding to the reference value that matches the pulse count of Step S31 is identified. In Step S33, when the REF signal pulse generated during the immediately succeeding low level ouput of the SGC signal is detected, the identified cylinder is set in a cylinder identification register of the microcomputer. Upon the occurrence of the next REF signal pulse generated when the SGC signal has a high level, the value in the cylinder identification register is changed by a predetermined amount to equal the number of the next cylinder in the firing order. At the same time, the number of pulses in the SGC signal is counted.

In this embodiment, each group of pulses in the SGC signal has a different form, so the different groups can be immediately identified.

In the embodiment of FIG. 11, cylinder identification is performed by counting the number of pulses of the SGC signal during the periods betwen REF signal pulses occurring when the SGC signal has a low level (such as in the period from T1 to T3). However, it is also possible to invert the SGC signal and to count the number of pulses of the SGC signal during periods between REF signals occurring when the SGC signal has a high level.

Figure 13:
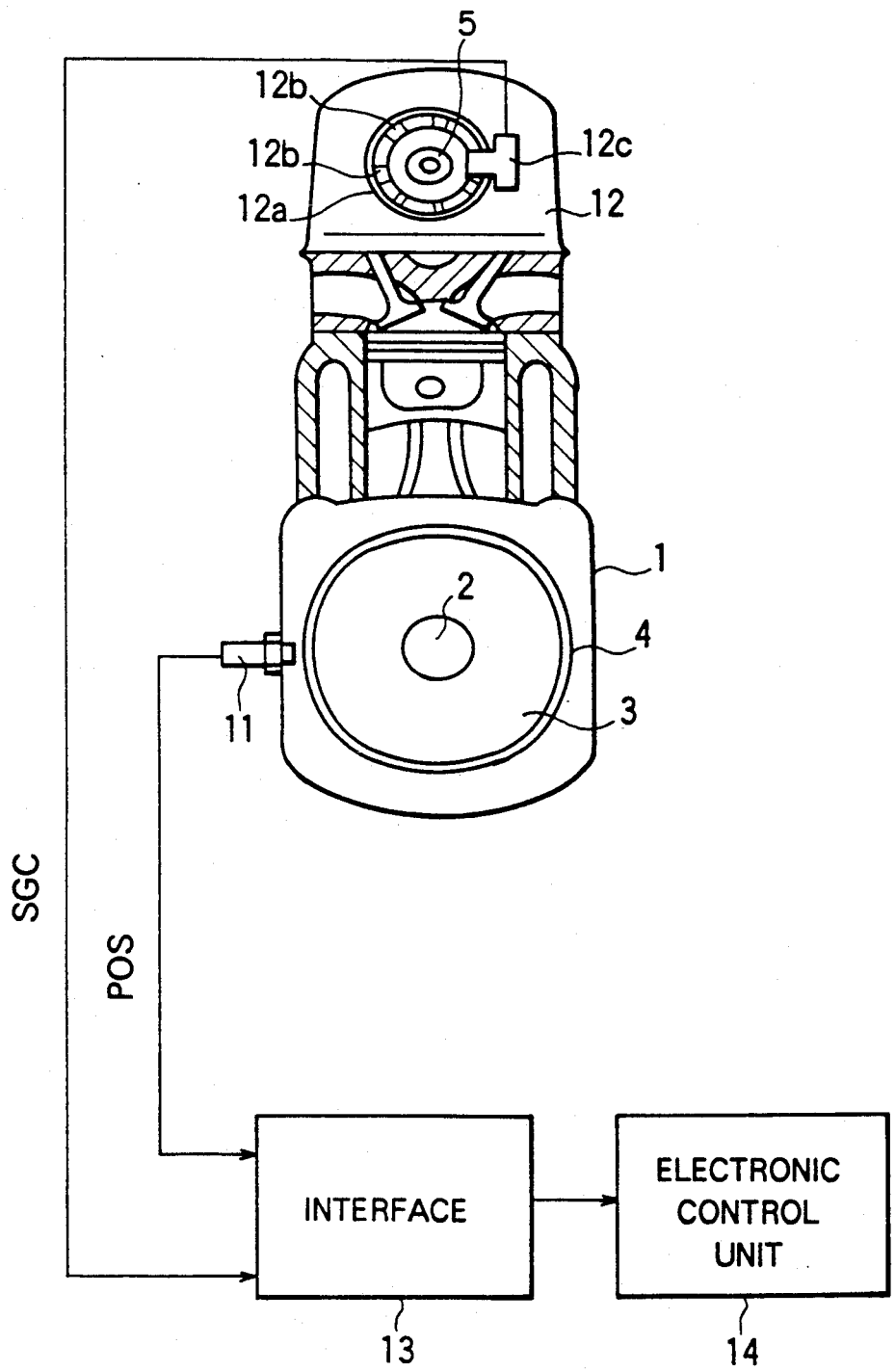
FIG. 13 is a partially cross-sectional elevation of an internal combustion engine equipped with another type of cylinder identification apparatus according to the present invention.

FIG. 13 is a partially sectional elevation of an engine 1 equipped with another embodiment of a cylinder identification apparatus according to the present invention. This embodiment is similar to the embodiment of FIG. 1 but is not equipped with a reference signal generator 10. Instead, a rotational signal generator 11 mounted on the engine 1 in the vicinity of a flywheel 3 generates a position signal (a POS signal) which not only indicates the rotation of the flywheel 3 but also indicates when the piston of any cylinder of the engine 1 is at a prescribed reference position.

Figure 14:
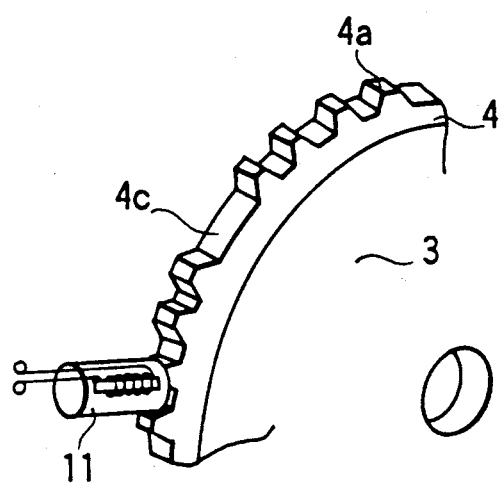
FIG. 14 is a perspective view of a portion of the flywheel of the engine illustrated in FIG. 13.

FIG. 14 is a perspective view illustrating a portion of the flywheel 3 and the rotational signal generator 11. A ring gear 4 is mounted on the periphery of the flywheel 3. The ring gear 4 has teeth 4a formed on its periphery at prescribed intervals, such as every 2 degrees as measured from the center of the flywheel 3. However, at three locations on the periphery of the ring gear 4, one or more teeth 4a are missing so as to create a gap 4c. The three gaps are spaced from one another by 120 degrees as measured from the center of the flywheel 3. The rotational signal generator 11 is an electromagnetic pickup disposed in the vicinity of the teeth 4a. Each time one of the teeth 4a passes by the rotational signal generator 11, it generates an electrical output signal comprising a pulse. In the gaps between teeth 4a and in the large gaps 4c, the output signal has a low level.

The identification signal generator 12 of this embodiment can be the same as that of the embodiment of FIG. 1. The output signal (the SGC signal) of the identification signal generator 12 and the POS signal from the rotational signal generator 11 are input to an ECU 14 comprising a microcomputer via an interface 13.

Figure 15:
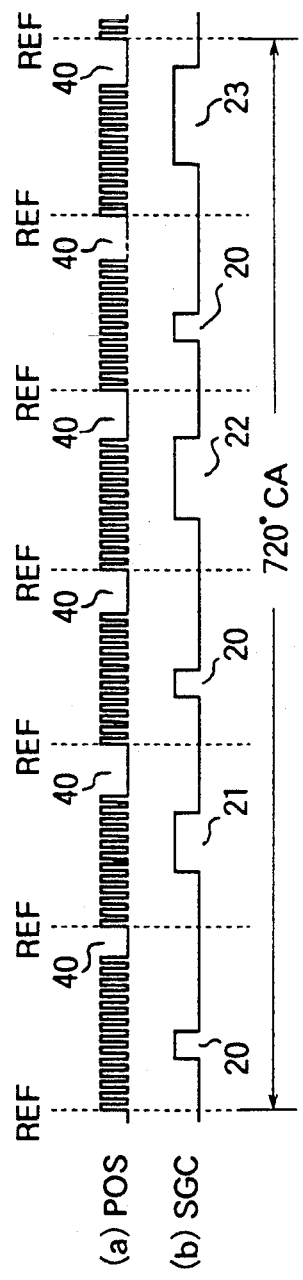
FIG. 15 is a waveform diagram illustrating the output signals of an embodiment of the present invention having the structure illustrated in FIGS. 13 and 14.
Figure 18:
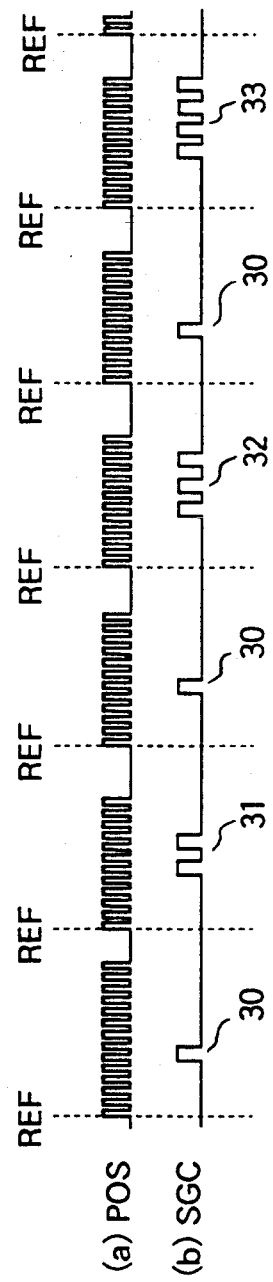

FIG. 15 is a waveform diagram illustrating the POS signal and the SGC signal of the embodiment of FIG. 13 subsequent to waveform shaping. The SGC signal is identical to that shown in FIG. 3, comprising four different types of pulses 20-23. The POS signal comprises pulses having a prescribed period (such as 2 degrees of crankshaft rotation) and low level periods 40 occuring every 120 degrees of crankshaft rotation and corresponding to the gaps 4c in the ring gear 4 of the flywheel 3. The rising edge of the first pulse following each of the low level periods 40 is used as a reference signal (a REF signal).

Cylinder identification can be performed using this embodiment by the same method used for the embodiment of FIG. 1. Namely, the pulse width of each pulse of the SGC signal occurring between consecutive REF signals is measured by counting the number of POS signal pulses occurring during the period that the SGC signal has a high level. The pulse count is then compared with reference values corresponding to the different cylinders. If the pulse count matches one of the reference values, the number of the corresponding cylinder is set in a cylinder identification register of the microcomputer of the ECU 14 as the identified cylinder. If the pulse count does not match one of the reference values (which occurs when the SGC signal pulse being measured is one of the first pulse 20), the number of the next cylinder in the firing order is set in the cylinder identification register. In other words, in this case, cylinder identification is carried out on the basis of the preceding result of cylinder identification.

This embodiment provides the same advantages as the embodiment of FIG. 1. It has the further advantage that it does not require a reference signal generator 10, so it can be more cheaply manufactured.

The SGC signal of a cylinder identification apparatus not employing a reference signal generator 10 is not restricted to the signal shown in FIG. 15. For example, it can have the same form as the SGC signal of any of the embodiments of FIGS. 5-12. FIGS. 16 through 20 are wave form diagrams of embodiments of the present invention having SGC signals identical to the SGC signals of the embodiments of FIG. 5, FIG. 6, FIG. 8, FIG. 10, and FIG. 11, respectively, subsequent to wave form shaping. The operation of the embodiments of FIGS. 16-20 is identical to the operation of the embodiments of FIGS. 5, 6, 8, 10, and 11 except that the REF signal derived from the POS signal is employed instead of a REF signal from a reference signal generator 10.

In the preceding embodiments, cylinder identification is performed by measuring the pulse width of a signal pulse of the SGC signal or by counting the number of pulses in a single group of pulses. However, it is also possible to perform cylinder identification by measuring the pulse widths of a plurality of pulses or by counting the number of pulses in a plurality of groups of pulses.

FIG. 21 is a flow chart of a program performed by the microcomputer of the ECU 14 of another embodiment of the present invention in which cylinder identification is carried out using a string of pulses. The structure of this embodiment is similar to that of the embodiment of FIG. 1, and the REF signal, the POS signal, and the SGC signal are the same as those shown in FIG. 3, so the program of FIG. 21 will be explained while referring to FIG. 3.

First, in step S41, the microcomputer measures the pulse width of each pulse of the SGC signal occurring between consecutive REF signal pulses by counting the number of POS signal pulses occurring during the time that the SGC signal has a high level. The pulse count is stored in a series register of the microcomputer, that stores both the pulse count corresponding to the most recent pulse of the SGC signal but also the pulse count corresponding to the immediately preceding pulse of the SGC signal. In Step S43, the most recent pulse count and the preceding pulse count are read out of the series register as a signal train, and in Step S44, the signal train is compared with a first reference signal train n1 corresponding to cylinder #1 of the engine. If the signal train matches the first reference signal train n1, then in Step S45 a 1 is set in the cylinder identification register of the microcomputer and a return is performed. If the signal train does not match the first reference signal train n1, then in Step S46, the signal train is compared with a second reference signal n2 corresponding to cylinder #2 of the engine. If the signal train matches the second reference signal train n2, then in Step S47, a 2 is set in the cylinder identification register and a return is performed. The microcomputer continues in this manner to seek a match between the signal train read from the series register and one of the reference signal trains. If upon the nth comparison in Step S48 a match has yet to be achieved, then in Step S50, the present cylinder is identified based on the previous result of cylinder identification, and the value in the cylinder identification register is incremented by a prescribed value (such as 1).

This embodiment provides the same advantages as the embodiment of FIG. 3. Furthermore, since cylinder identification is carried out on the basis of the pulse counts for two consecutive pulses of the SGC signal, there is less likelihood of mistaken identification of a cylinder.

The cylinder identification method employed in this embodiment can also be applied to embodiments having signal wave forms like those illustrated in FIGS. 5, 6, 8, 10, and 11 as well. In each case, a pulse series corresponding to two consecutive cylinders of the engine is compared with a reference pulse series to identify each cylinder.

In the method of FIG. 21, each pulse series corresponds to two consecutive cylinders. However, the length of the pulse series is not restricted, and it is possible to perform cylinder identification using a pulse series corresponding to three or more consecutive cylinders.

The REF signal is important for the operation of a cylinder identification apparatus according to the present invention. In the previous embodiments, if the REF signal generator malfunctions and the REF signal is not generated, cylinder identification can not be carried out properly. According to another embodiment of the present invention, this problem is solved by automatically generating a REF signal from the SGC signal when the REF signal is abnormal. FIG. 22 is a waveform diagram of the REF signal, the POS signal, and the SGC signal of this embodiment subsequent to waveform shaping. The structure of this embodiment is basically the same as that the of the embodiment of FIG. 1, and the SGC signal has the same wave form as in FIG. 3. The rising edge of each pulse of the SGC signal is delayed by an offset $\theta$ from the rising edge of a pulse of the REF signal. In a six-cylinder engine, a REF signal pulse is output every 120 degrees of crankshaft rotation, so the rising edge of a REF signal pulse occurs $(120-\theta)$ degrees of crankshaft rotation after the rising edge of an SGC signal pulse.

Figure 23:
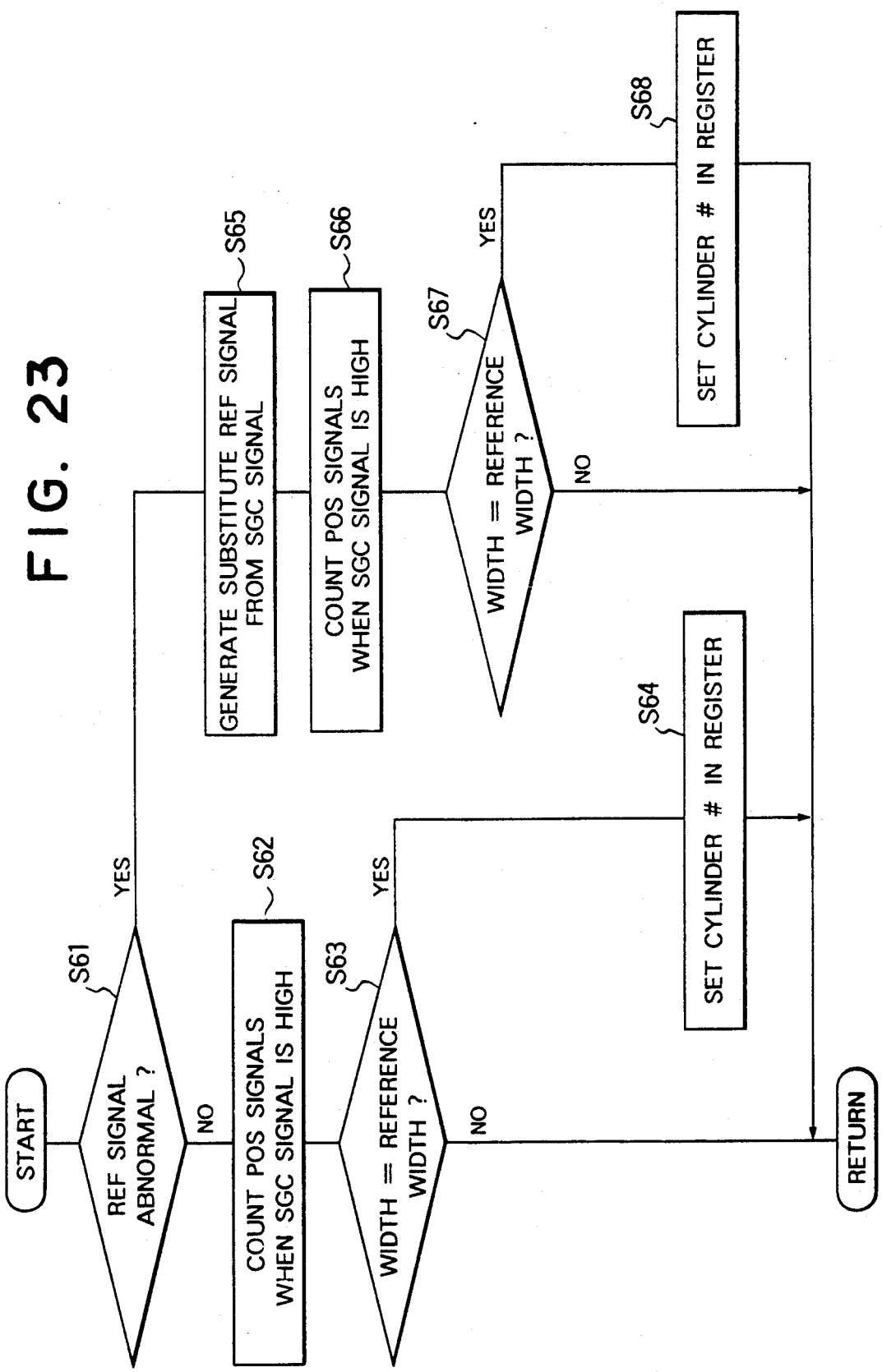
FIG. 23 is a flow chart of the operation of the embodiment of FIG. 22.

FIG. 23 is a flow chart of a program performed by the microcomputer of the ECU 14 of this embodiment for carrying out cylinder identification. In step S61, it is determined whether the REF signal is abnormal. The REF signal is determined to be abnormal if its value fails to change during a prescribed length of time. If it is determined that the REF signal is normal, the program proceeds to Step S62, and the subsequent operation of this embodiment is identical to that of the embodiment of FIG. 1, so Steps S62–S64 are the same as Steps S1–S3 of FIG. 4. However, if in Step S61 it is determined that the REF signal is abnormal, then in Step S65, the microcomputer creates a substitute REF signal at the time that a normal REF signal should have been generated. Namely, it creates a substitute REF signal at $(120-\theta)$ degrees of crankshaft rotation after the rising edge of each SGC signal pulse. The microcomputer can measure the rotational angle $(120-\theta)$ by counting the pulses of the POS signal, which are output at prescribed intervals (such as every 2 degrees) of crankshaft rotation. Using the substitute REF signal, the microcomputer then performs cylinder identification in Steps S66–S68, which correspond to Steps S62–S64, respectively.

It can be seen that this embodiment of the present invention can perform accurate cylinder identification even when the REF signal generator malfunctions.

Figure 22:
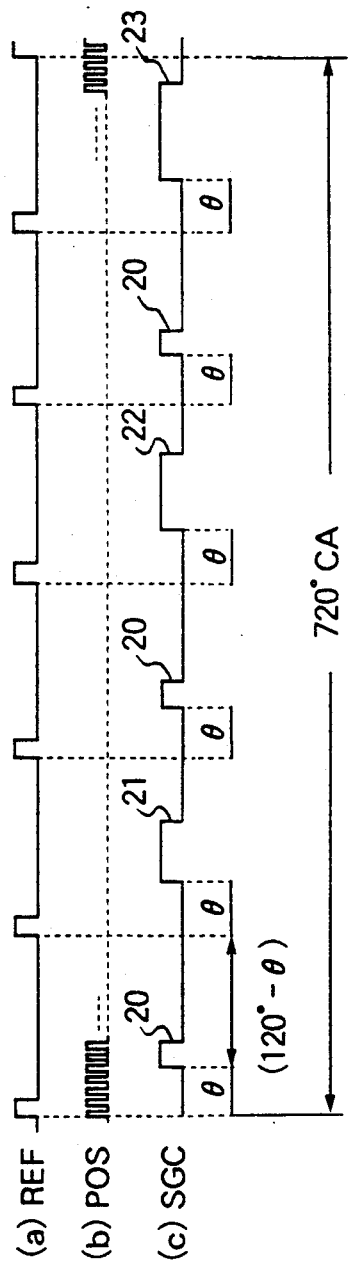
FIG. 22 is a waveform diagram illustrating the output signal of another embodiment of the present invention in which a substitute REF signal is generated upon the failure of the reference signal generator.

In the embodiment of FIG. 22, $\theta$ is equal to approximately 20 degrees, but the magnitude of $\theta$ can be different.

Figure 24:
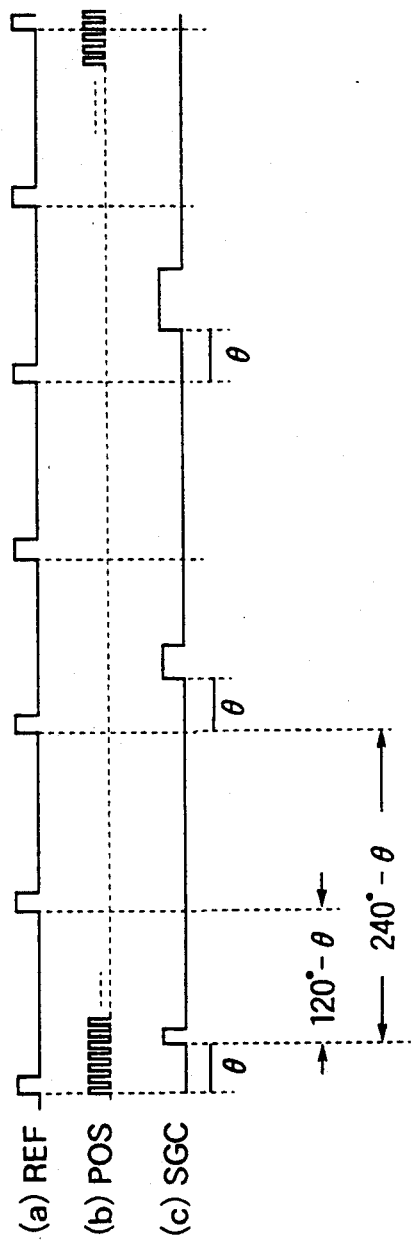
FIGS. 24-28 are waveform diagrams of the output signals of other embodiments of the present invention in which a substitute REF signal is generated upon the failure of the REF signal generator.

FIG. 24 is a waveform diagram of an embodiment similar to FIG. 5 in which an SGC signal pulse is generated between alternate pairs of REF signal pulses. The leading edge of each pulse of the SGC signal is delayed by an angle $\theta$ with respect to the leading edge of a REF signal pulse. When the REF signal is normal, i.e., generated every 120 degrees of crankshaft rotation, cylinder identification is carried in the manner described with respect to FIG. 5. However, if the level of the REF signal does not change for more than a prescribed length of time, the microcomputer of the ECU 14 determines that the REF signal is abnormal, and a substitute REF signal is generated by the microcomputer based on the SGC signal. Namely, the microcomputer generates a first substitute REF signal pulse at $120-\theta$ degrees and then a second substitute REF signal pulse at $240-\theta$ degrees of crankshaft rotation after the leading edge of each SGC signal pulse. Cylinder identification is then performed in the same manner as described with respect to FIG. 5 except that the substitute REF signal pulses are used in place of the normal REF signal pulses.

Figure 25:
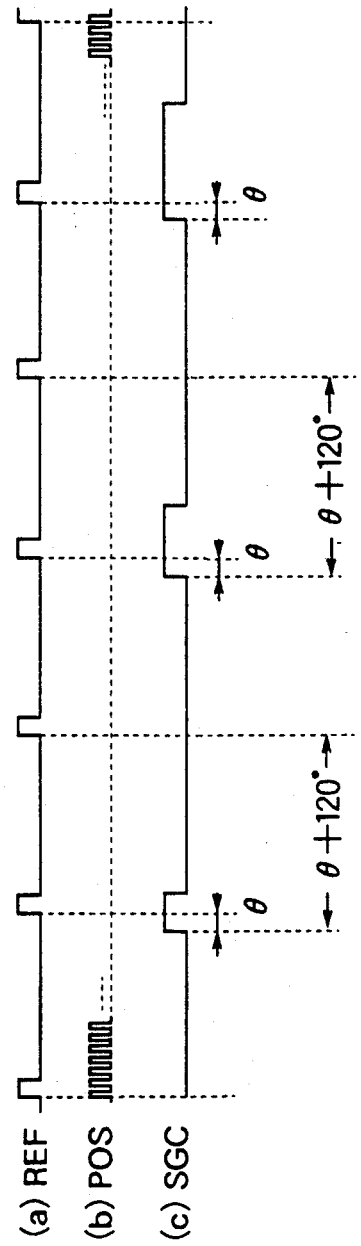

FIG. 25 is a waveform diagram of an embodiment similar to FIG. 6, in which, during normal operation, alternate REF signal pulses are generated at times that the SGC signal has a high level, and the remaining REF signal pulses are generated at times that the SGC signal has a low level. The leading edge of each pulse of the SGC signal is advanced by an angle $\theta$ from the leading edge of one of the REF signal pulses.

When the microcomputer determines that the REF signal is being generated normally, cylinder identification is carried out using this embodiment in the same manner as described with respect to FIG. 6. However, if the level of the REF signal fails to change for more than a prescribed period, then the microcomputer determines that the REF signal is abnormal, and it generates substitute REF signal pulses on the basis of the SGC signal. A first substitute REF signal pulse is generated $\theta$ degrees after the leading edge of each SGC signal pulse, and a second substitute REF signal pulse is generated at $\theta+120$ degrees after the leading edge of each SGC signal pulse. The substitute REF signal pulses occur at the same time as the usual REF signal pulses would normally occur. Cylinder identification is then performed in the same manner as described with respect to FIG. 6 except that the substitute REF signal pulses are used in place of the normal REF signal pulses.

Figure 26:
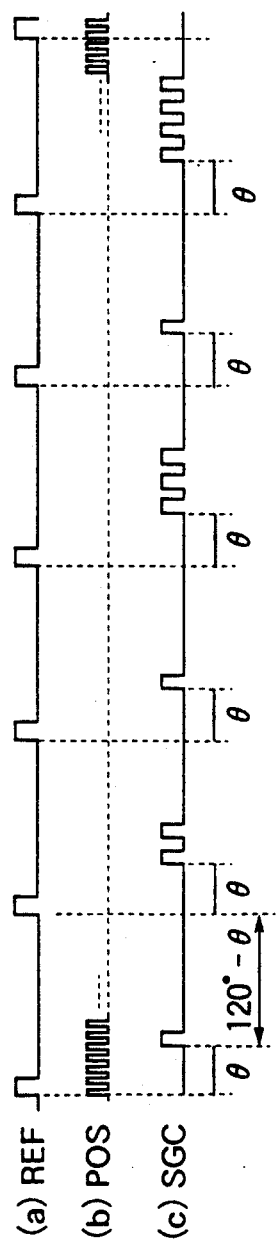

FIG. 26 is a waveform diagram of an embodiment similar to FIG. 8 in which the SGC signal comprises groups of one to four pulses generated between consecutive REF signal pulses. The leading edge of the first pulse in each group is delayed from the leading edge of the immediately preceding REF signal pulse by an angle $\theta$.

When the REF signal is generated normally, cylinder identification is performed by this embodiment in the same manner as described with respect to FIG. 8. However, when the REF signal level fails to change for more than a prescribed length of time, the microcomputer determines that the REF signal is abnormal and it generates substitute REF signals based on the SGC signal. A substitute REF signal is generated at $120-\theta$ degrees after the leading edge of the first pulse in each group. Cylinder identification is then performed in the same manner as described with respect to FIG. 8 except that the substitute REF signal pulses are used in place of the normal REF signal pulses.

Figure 27:
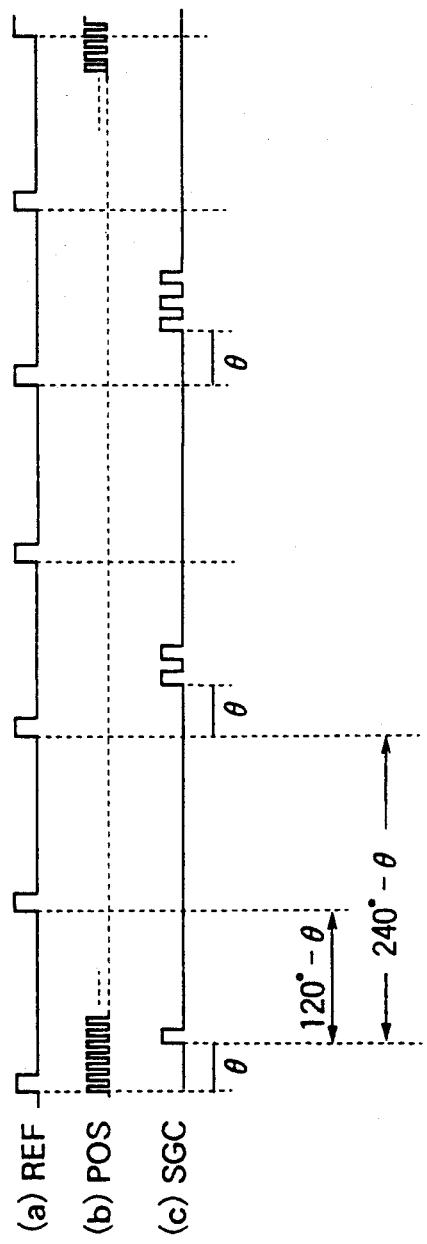

FIG. 27 is a waveform diagram of an embodiment similar to FIG. 10 in which the SGC signal comprises groups of one to three pulses generated between alternate pairs of REF signal pulses. The leading edge of the first pulse in each group of the SGC signal is delayed by an angle $\theta$ with respect to the leading edge of a REF signal pulse. When the REF signal is normal, i.e., generated every 120 degrees of crankshaft rotation, cylinder identification is carried in the manner decribed with respect to FIG. 10. However, if the REF signal maintains the same level for more than a prescribed length of time, the microcomputer of the ECU 14 determines that the REF signal is abnormal, and a substitute REF signal is generated by the microcomputer bases on the SGC signal. Namely, the microcomputer generated a first substitute REF signal pulse at $120-\theta$ degrees and a second substitute REF signal pulse at $240-\theta$ degrees of crankshaft rotation after the leading edge of the first pulse in each pulse group of the SGC signal. Cylinder identification is then performed in the same manner as described with respect to FIG. 10 except that the substitute REF signal pulses are used in place of the normal REF signal pulses.

Figure 28:
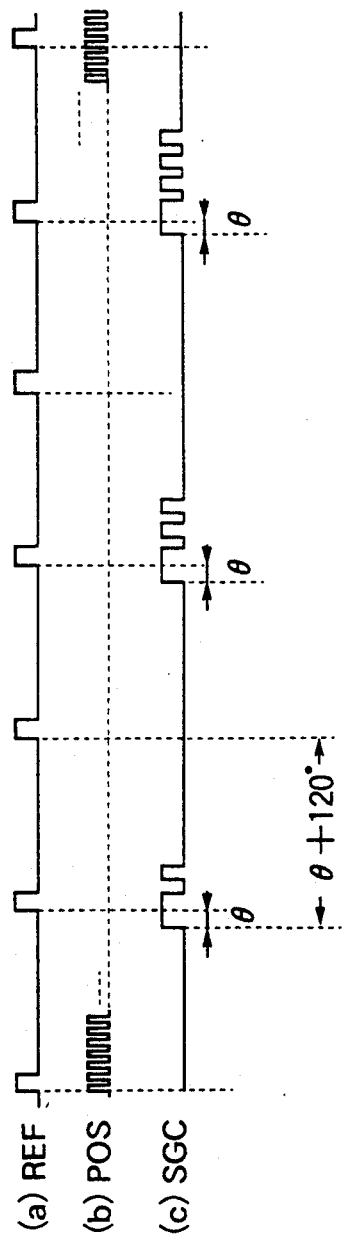

FIG. 28 is a waveform diagram of an embodiment similar to FIG. 11 in which the SGC signal comprises a plurality of pulse groups having two to four pulses, with the first pulse of each group being longer than the other pulses in the same group. During normal operation, alternate REF signal pulses are generated at times that the first pulse in a pulse group of the SGC signal has a high level, and the remaining REF signal pulses are generated at times that the SGC signal has a low level. The leading edge of the first pulse in each pulse group of the SGC signal is advanced by an angle $\theta$ from the leading edge of one of the REF signal pulses.

When the microcomputer determines that the REF signal is being generated normally, cylinder identification is carried out using this embodiment in the same manner as described with respect to FIG. 11. However, if the level of the REF signal fails to change for more than a prescribed period, then the microcomputer determines that the REF signal is abnormal, and it generates a substitute REF signal on the basis of the SGC signal. A first substitute REF signal pulse is generated $\theta$ degrees after the leading edge of the first pulse in each pulse group of the SGC signal, and a second substitute REF signal pulse is generated at $\theta + 120$ degrees after the leading edge of the first pulse in each pulse group. The substitute REF signal pulses occur at the same time as the usual REF signal pulses would normally occur. Cylinder identification is then performed in the same manner as described with respect to FIG. 11 except that the substitute REF signal pulses are used in place of the normal REF signal pulses.

From the above descriptions of the embodiments of FIGS. 22, 24, 25, 26, 27, and 28, it can be seen that cylinder identification can continue to be performed upon the failure of the reference signal generator 10, regardless of the type of SGC signal being employed.

In the previous embodiments, cylinder identification becomes impossible when the identification signal generator 12 malfunctions. This problem is solved in another embodiment of the present invention in which cylinder identification is carried out on the basis of the REF signal when failure of the identification signal generator 12 is sensed.

Figure 29:
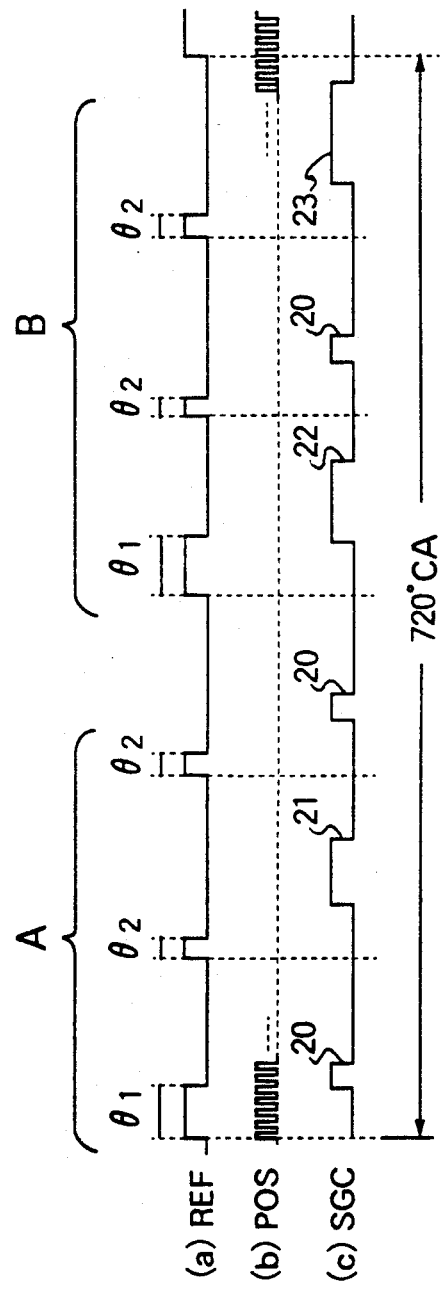
FIG. 29 is a waveform diagram of the output signals of another embodiment of the present invention in which cylinder identification is performed on the basis of the REF signal upon the failure of the identification signal generator.

FIG. 29 is a waveform diagram of the REF signal, the POS signal, and the SGC signal of this embodiment subsequent to waveform shaping. The POS signal and the SGC signal are identical to those of the embodiment of FIG. 3, but the REF signal pulses have two different pulse widths. Every third pulse of the REF signal has a pulse width $\theta_1$, while the other pulses have a pulse width $\theta_2$ which is different from $\theta_1$ (either longer or shorter). A REF signal having this form can be produced by increasing the circumferential dimension of one of the three reference teeth 4b on the ring gear 4 of FIG. 2. The structure of this embodiment is otherwise similar to that shown in FIG. 1. The REF signal pulses with the larger pulse widths $\theta_1$ correspond to prescribed cylinders, such as the first and the fourth cylinders in the firing order of the engine.

During normal operation of the identification signal generator 12, cylinder identification is performed in the same manner described with respect to FIG. 4. However, when the level of the SGC signal fails to change for a prescribed length of time, the microcomputer of the ECU 14 determines that the identification signal generator 12 is malfunctioning, and cylinder identification is carried out based on the REF signal. In the present embodiment, the cylinders of the engine can be divided into two groups A and B, each of which contains 3 cylinders. The microcomputer can identify the first cylinder in each group by the pulse having a pulse width $\theta_1$, and it can identify the second and third cylinders of each group by the positions of the pulses having a pulse width $\theta_2$ with respect to the pulse having a pulse width $\theta_1$. However, the microcomputer can not determine whether a given pulse of the REF signal corresponds to group A or group B. Therefore, the microcomputer fires the spark plug of a cylinder in group A at the same time that it fires the spark plug of the corresponding cylinder in group A. Namely, it fires the spark plug of the first cylinder in group A at the same time that it fires the spark plug of the first cylinder in group B, it fires the spark plug of the second cylinder in group A at the same time that it fires the spark plug of the second cylinder in group B, and it fires the spark plug of the third cylinder in group A at the same time that it fires the spark plug of the third cylinder in group B. When the spark plugs of a pair of cylinders are simultaneously fired in this manner, only one of the two cylinders in the pair will actually ignite at the time of firing, since one of the cylinders will be at the end of its exhaust stroke (if the spark plug is fired BTDC) or at the beginning of its suction stroke (if the spark plug is fired ATDC) and will not contain any fuel that can be ignited by the spark plug. However, the firing of a spark plug in a cylinder in its exhaust or suction stroke does not produce any particular problem, so the engine can continue operating even if the SGC signal is not being generated.

In the embodiment of FIG. 29, the SGC signal has the same waveform as the embodiment of FIG. 3, but cylinder identification based on the REF signal can be carried out regardless of the form of the SGC signal. For example, the SGC signal can have the same form as in any of the preceding embodiments.

In the embodiment of FIG. 29, the REF signal comprises pulses having two different pulse widths $\theta_1$ and $\theta_2$. However, the REF signal could instead comprise groups of pulses containing one or more pulses, and the two groups of cylinders in the engine could be distinguished from one another by varying the number of pulses in the pulse groups rather than the pulse widths.

FIG. 29 shows the case in which the engine is equipped with 6 cylinders, but cylinder identification can be carried out in a similar manner in an engine having a different number of cylinders.

In the preceding embodiments, the identification signal generator 12 is mounted on the camshaft 5 of the engine. However, it can be mounted on any member rotating at half the speed of the crankshaft 2, such as the rotating shaft of an unillustrated distributor for the engine 1.

What is claimed is:

1. A cylinder identification apparatus for a multi-cylinder internal combustion engine, comprising:

reference signal generating means for sensing the rotation of a crankshaft of the engine and generating a reference signal including at least one pulse indicating each time the crankshaft is at a prescribed rotational angle, wherein the number of the pulses of the reference signal per revolution of the crankshaft is proportional to the number of cylinders in the engine;

an identification signal generator for sensing the rotation of a member coupled to and rotating at ½ the speed of the crankshaft and generating a cylinder identification signal having a different form for different cylinders of the engine; and control means for identifying each cylinder of the engine based on the cylinder identification signal and for generating engine control signals for the cylinders identified in accordance with the reference signal.

2. A cylinder identification apparatus as claimed in claim 1 wherein the cylinder identification signal comprises a plurality of pulses having different pulse widths, each pulse corresponding to a cylinder of the engine, and the control means comprises means for identifying the cylinder corresponding to each pulse of the cylinder identification signal by measuring the pulse width.

3. A cylinder identification apparatus as claimed in claim 2 wherein the pulses of the cylinder identification signal have fewer pulse widths than there are cylinders in the engine.

4. A cylinder identification apparatus as claimed in claim 3 wherein:
the reference signal comprises a series of pulses;
a pulse of the cylinder identification signal is generated between each pair of consecutive reference signal pulses;
the cylinder identification signal pulses have (n/2+1) different pulse widths, wherein n is the number of cylinders in the engine; and
pulses of the cylinder identification signal having a first width alternate with pulses having one of the other widths.

5. A cylinder identification apparatus as claimed in claim 3 wherein:
the reference signal comprises a series of pulses;
a pulse of the cylinder identification signal is generated only between alternate pairs of consecutive reference signal pulses; and
the cylinder identification signal pulses have n/2 pulse widths, wherein n is the number of cylinders in the engine, and these n/2 pulse widths alternate with one another.

6. A cylinder identification apparatus as claimed in claim 3 wherein the reference signal comprises a series of pulses and each pulse of the cylinder identification signal is generated only at the time of every other reference signal pulse.

7. A cylinder identification apparatus as claimed in claim 1 wherein:
the identification signal comprises a plurality of pulse groups, each of which comprises at least one pulse, each group corresponding to a cylinder of the engine; and
the control means comprises means for identifying the cylinder corresponding to each pulse group by counting the number of pulses in the group.

8. A cylinder identification apparatus as claimed in claim 7 wherein the number of the pulse groups is smaller than the number of cylinders in the engine.

9. A cylinder identification apparatus as claimed in claim 8 wherein:
the reference signal comprises a series of pulses;
a pulse group of the cylinder identification signal is generated between each pair of consecutive reference signal pulses;
the cylinder identification signal has (n/2+1) different pulse groups, wherein n is the number of cylinders in the engine; and
cylinder identification signal pulse groups having a first number of pulses alternate with cylinder identification signal pulse groups having different numbers of pulses.

10. A cylinder identification apparatus as claimed in claim 8 wherein:
the reference signal comprises a series of pulses;
a pulse group of the cylinder identification signal is generated only between alternate pairs of consecutive reference signal pulses; and
the identification signal has n/2 different pulse groups wherein n is the number of cylinders in the engine, and these n/2 pulse groups alternate with one another.

11. A cylinder identification apparatus as claimed in claim 8 wherein:
the reference signal comprises a series of pulses;
every other reference signal pulse overlaps the first pulse in a pulse group of the cylinder identification signal; and
the control means comprises means for counting the number of pulses in each pulse group having a pulse overlapping a reference signal.

12. A cylinder identification apparatus as claimed in claim 1 wherein:
the reference signal comprises a series of pulses; and
the cylinder identification signal is generated between each pair of consecutive reference signal pulses;
the control means comprises means for identifying each cylinder based on the form of the cylinder identification signal over a period spanning at least three consecutive reference signal pulses.

13. A cylinder identification apparatus as claimed in claim 1 wherein the reference signal generating means comprises a flywheel mounted on the crankshaft and having a ring gear with a plurality of teeth at prescribed intervals in the circumferential direction of the ring gear and a plurality of gaps between the teeth at prescribed intervals in the circumferential direction of the ring gear, the intervals between consecutive gaps being larger than the intervals between consecutive teeth; and
means for sensing the gaps in the teeth and generating a pulse each time one of the gaps is sensed.

14. A cylinder identification apparatus as claimed in claim 1 wherein the reference signal generating means comprises means for generating a series of pulses, every (n/2)nd reference signal pulse being a first pulse and the remaining pulses being second pulses that differ in form from the first pulse, wherein n is the number of cylinders in the engine.

15. A cylinder indentification apparatus as claimed in claim 14, wherein the first and second pulses have different pulse widths.

16. A cylinder identification apparatus as claimed in claim 1 further comprising means for generating a substitute reference signal when the reference signal generating means is abnormal.

17. A cylinder identification apparatus as claimed in claim 1, wherein the prescribed angle is 120 degrees.

18. A cylinder identification apparatus as claimed in claim 1, wherein the cylinder identification signal is offset from the reference signal.

19. A cylinder identification apparatus as claimed in claim 18, wherein the prescribed angle is 120 degrees.

20. A cylinder identification apparatus as claimed in claim 1,
wherein the cylinder identification signal includes a plurality of pulses,
wherein the reference signal includes a plurality of pulses, and
wherein each of the pulses of the cylinder identification signal is offset from and between each of the pulses of the reference signal.

21. A cylinder identification apparatus as claimed in claim 20, wherein the prescribed angle is 120 degrees.

22. A cylinder identification apparatus for a multi-cylinder engine equipped with a crankshaft on which a flywheel is mounted, comprising:
a ring gear mounted on the flywheel having reference teeth formed thereon at intervals of 720/n degrees, wherein n is the number of cylinders in the engine;

a reference signal generator disposed in the vicinity of the ring gear for sensing the reference teeth on the ring gear and generating a reference signal having a pulse each time one of the reference teeth passes by the reference signal generator;

an identification signal generator for sensing the rotation of a member coupled with and rotating at ½ the speed of the crankshaft and generating a cylinder identification signal comprising a series of pulse groups each of which comprises at least one pulse and has an identifying characteristic, each pulse group corresponding to a cylinder of the engine, the number of different pulse groups being smaller than the number of cylinders in the engine; and control means for identifying the cylinder corresponding to each of the pulse groups based on the identifying characteristic of the pulse group and for generating engine control signals for the cylinder identified in accordance with the reference signal.

23. A cylinder identification apparatus as claimed in claim 22, wherein the ring gear comprises a plurality of regular teeth, and each of the reference teeth are integrally formed with one of the regular teeth.

24. A cylinder identification method for a multi-cylinder internal combustion engine, comprising:

(a) sensing the rotation of a crankshaft of the engine and generating a reference signal, including at least one pulse, indicating each time the crankshaft is at a prescribed rotational angle, wherein the number of the pulses of the reference signal per revolution of the crankshaft is proportional to the number of cylinders in the engine;

(b) sensing the rotation of a member coupled with and rotating at ½ the speed of the crankshaft and generating a cylinder identification signal comprising a series of pulse groups each of which comprises at least one pulse and has an identifying characteristic, each of the pulse groups corresponding to a cylinder of the engine, the number of different pulse groups being smaller than the number of cylinders in the engine;

(c) identifying the cylinder corresponding to each of the pulse groups based on the identifying characteristic of each of the pulse groups of the cylinder identification signal; and (d) generating engine control signals for the cylinder identified in accordance with the reference signal.

25. A cylinder identification method as claimed in claim 24 wherein step (c) comprises the step of offsetting the cylinder identification signal from the reference signal.

26. A cylinder identification method as claimed in claim 24, wherein the reference signal includes a plurality of pulses, and wherein step (c) comprises the step of offsetting each of the pulse groups of the cylinder identification signal from and between each of the pulses of the reference signal.

* * * * *